United States Patent
Leuermann

(10) Patent No.: US 7,726,679 B2
(45) Date of Patent: Jun. 1, 2010

(54) TRAILER ALIGNMENT APPARATUS

(76) Inventor: Walter Bernard Albert Leuermann, 16 Cunningham Street, Rochedale, QLD 4123 (AU)

(*) Notice: Subject to any disclaimer, the term of this patent is extended or adjusted under 35 U.S.C. 154(b) by 266 days.

(21) Appl. No.: 11/421,130

(22) Filed: May 31, 2006

(65) Prior Publication Data
US 2007/0029757 A1 Feb. 8, 2007

(30) Foreign Application Priority Data
Jun. 2, 2005 (AU) .............................. 2005902847

(51) Int. Cl.
*B60D 1/36* (2006.01)
(52) U.S. Cl. .................. 280/477; 280/255; 280/503; 280/504; 280/475
(58) Field of Classification Search ................ 280/477, 280/3, 504, 503, 255, 475
See application file for complete search history.

(56) References Cited

U.S. PATENT DOCUMENTS

| | | | |
|---|---|---|---|
| 2,994,541 A | 8/1961 | Dobbins | |
| 3,482,847 A | 12/1969 | Hart | |
| 3,738,672 A * | 6/1973 | Dalton | 280/3 |
| 3,826,324 A | 7/1974 | Stevens | |
| 3,937,479 A * | 2/1976 | Dalton | 280/3 |
| 4,168,074 A * | 9/1979 | Morris | 280/3 |
| 4,227,706 A * | 10/1980 | Morris | 280/3 |
| 4,470,564 A | 9/1984 | Johnson | |
| 4,883,280 A | 11/1989 | Christian | |
| 5,338,047 A | 8/1994 | Knisley | |
| 5,501,482 A * | 3/1996 | McClive | 280/503 |
| 6,990,745 B1* | 1/2006 | Schoenenberger | 33/760 |
| 7,392,868 B2* | 7/2008 | Johansson et al. | 180/19.1 |
| 2005/0218626 A1* | 10/2005 | Kwilinski | 280/477 |
| 2007/0205580 A1* | 9/2007 | Hamilton et al. | 280/477 |

FOREIGN PATENT DOCUMENTS

| | | |
|---|---|---|
| DE | 3443164 A1 | 11/1984 |
| NL | 1018798 | 8/2001 |

OTHER PUBLICATIONS

European Search Report for EP 06 01 1323 (5 pages).
Australian Search Report for AU 2005902847 (2 pages).

* cited by examiner

*Primary Examiner*—Lesley Morris
*Assistant Examiner*—Tashiana Adams
(74) *Attorney, Agent, or Firm*—Lackenbach Siegel, LLP; Andrew F. Young

(57) ABSTRACT

An apparatus and method for maneuvering a trailer having jockey wheel assembly comprising a ground engaging wheel (33) rotatably mounted on an axle (34). The apparatus comprising a link member (20) which is adapted to be pivotally mounted on the jockey wheel assembly adjacent the axle (34) and a lever assembly (10) removably securable to said link (20) and adapted to engage a peripheral surface (39) of said wheel (33), whereby movement of said lever (10) rotates said wheel (33).

8 Claims, 13 Drawing Sheets

TRAILER ALIGNMENT APPARATUS

RELATED APPLICATION

This application claims priority to Australian Application No. 2005902847, filed Jun. 2, 2005, the content of which is incorporated herein by reference in its entirety.

FIELD OF THE INVENTION

The present invention relates to an alignment aid for the manual alignment of the towing hitch of a trailer, caravan, boat trailer, horse float or the like with the tow-ball of a vehicle. In particular although not exclusively the present invention relates to a trailer alignment apparatus suited to a jockey wheel assembly which temporarily supports the towing hitch of the trailer.

BACKGROUND ART

Typically trailers, caravans, boat trailers, horse floats and the like are provided with a jockey or manoeuvring wheel assembly. The wheel assembly is provided to facilitate movement of the trailer over relatively short distances. The wheel assembly typically includes a raising and lowering mechanism for both levelling of the trailer, and the engagement of and/or removal of the towing hitch from the tow-ball.

Manually manoeuvring of the trailer via the jockey wheel is relatively simple when the trailer is carrying a light load. However in instances where the trailer is carrying a large load, manual manoeuvring the trailer can be exceedingly difficult. In such situations the trailer may escape the control of a person manoeuvring the trailer and start to freewheel. This freewheeling can result in the trailer colliding into the towing vehicle, or worse still running down the person manoeuvring the trailer. Accordingly, a number of jockey wheel manufacturers have implemented several arrangements in order to aid manoeuvring and to reduce the risk of freewheeling.

One such arrangement is disclosed in WO 2004037567 entitled 'Jockey Wheel Assembly', which describes a jockey wheel assembly having a drive system including a crank coupled to a rotatable shaft which is inturn coupled to the wheel hub. Rotation of the crank causes rotation of the shaft, this rotation then being translated into linear movement by the wheel, in a forward or reverse direction depending on the direction of rotation of the crank. The assembly is also provided with a tiller which enables the user to control the direction the wheel is facing and thus control the direction of movement of the trailer. The problem with such an arrangement is that it utilises a number of gears and these gears under the strain of moving such large loads are prone to wear, sheering and slippage, which can lead to a momentarily loss of control over the trailer. This momentary loss of control may be all that is required to cause the trailer to freewheel.

Another example of such a jockey wheel assembly is disclosed in AU 2002100165 to Ark Engineering Pty Ltd entitled 'Jockey Wheel'. The assembly includes a frame mountable on a trailer, a wheel frame and a lever arm. The lever includes a ratchet arm which mates with a corresponding pawl mounted on the frame. The pawls being operable upon pivotal movement of the lever to selectively move or restrain rotation of the wheel in the frame. Again such an arrangement utilises a complex mechanical arrangement which is prone wear to shearing and slippage.

Furthermore in both the above arrangements the tyre of the jockey wheel is prone to slip on the wheel hub when the hub is mechanically driven. Such a slippage again can lead to the trailer freewheeling. If the tyre is a pneumatic tyre this slippage can tear out the valve stem leading to deflation of the tyre requiring the replacement of the stem or entire inner tube.

Clearly it would be advantageous to provide an alignment apparatus which substantially ameliorates one or more of the aforementioned problems and that is relatively simple to manufacture and use.

SUMMARY OF THE INVENTION

Accordingly in one aspect of the invention there is provided an apparatus for manoeuvring a trailer having a jockey wheel assembly comprising a ground engaging wheel rotatably mounted on an axle said apparatus comprising:
  a lever assembly adapted to engage the peripheral surface of said wheel, whereby movement of said lever thereby rotates said wheel.

In another aspect of the invention there is provided an apparatus for manoeuvring a trailer having a jockey wheel assembly a ground engaging wheel rotatably mounted on an axle, said apparatus comprising:
  a link member pivotally mounted on the jockey wheel assembly adjacent the axle; and
  a lever assembly removably securable to said link and adapted to engage a peripheral surface of said wheel, whereby movement of said lever rotates said wheel.

In a further aspect of the present invention there is provided a method of manoeuvring a trailer having a jockey wheel assembly comprising a ground engaging wheel rotatably mounted on an axle, said method comprising the steps of:
  positioning a lever assembly on a peripheral surface of said wheel;
  applying a force to said lever assembly whereby said lever assembly grips the peripheral surface of said wheel thereby causing rotation of said wheel.

In another aspect of the invention there is provided a method of manoeuvring a trailer having a jockey wheel assembly comprising a ground engaging wheel rotatably mounted on an axle, said method comprising the steps of:
  pivotally mounting a link on the wheel assembly adjacent the axle;
  coupling a lever assembly to said link, such that said lever assembly engages a peripheral surface of said wheel; and
  applying a force to said lever assembly, so as to cause said lever to rotate said wheel.

In a further aspect of the present invention there is provided an alignment apparatus for manoeuvring a trailer having jockey wheel assembly comprising a ground engaging wheel rotatably mounted on a hollow axle, said apparatus comprising:
  a link member coupled to a lever assembly adapted to engage a peripheral surface of said wheel, said link member adapted for insertion into said hollow axle to thereby pivotally mount the link member and lever assembly on the jockey wheel assembly; and
  whereby, upon insertion of the link member into said hollow axle, lateral movement of the lever assembly directs the wheel on a desired direction of travel and, upon the lever assembly engaging said wheel, rotation of the lever about the pivotal mount acts to rotate the wheel for manoeuvring the trailer in the desired direction of travel.

Preferably the lever assembly includes a handle and a wheel engagement portion disposed at one end of the handle. The lever assembly may be manufactured from high grade carbon steel, or other such suitable material capable of withstanding the shear forces generated during movement of a heavily laden trailer or the like. Suitably the handle has a plurality of apertures disposed at a predetermined distance from the pad.

The wheel engagement portion may be in the form of a pad. The pad may be any suitable closed shape such as a square, rectangle, hexagon, pentagon, triangle or circle. Most preferably the pad is substantially circular in shape. Suitably the pad may be coated with a material having a relatively high coefficient of friction such as vulcanised rubber or the like. The pad may be provided with a formation, such as series of grooves that match the shape of the peripheral surface wheel to further increase the frictional engagement therebetween.

Alternatively the wheel engagement portion may take the form of a tooth or the like wherein said tooth is shaped for complementary engagement with the peripheral surface of the wheel. Suitably the peripheral surface of the wheel is in the form of a treaded tyre.

Suitably the link member is pivotally mounted on the outside of the wheel assembly, or on the inside wheel assembly between the wheel mount and the wheel by any suitable fastening means such as a bolt or cotter pin. Preferably the link is mounted adjacent the axle. Most preferably the link is mounted on the axle of the wheel assembly.

Preferably the link is a single elongate member. Alternatively the link may be formed from a plurality of interlinked members. The link may include one or more mounting plates secured the end of the link. In the case where the axle is hollow the link member is preferably in the form of a rigid C-shaped bar wherein one arm of the bar is coupled to the lever assembly and the remaining arm is adapted for insertion into the hollow axle.

Preferably the link extends about a portion of the wheel forming a space therebetween into which the lever can be inserted. The link may have a pin slideably mounted thereon, said pin being inserted into one of the plurality of apertures provided in the handle, to thereby secure the lever assembly to the link in a removable manner.

Alternatively the link may extend from the frame adjacent the wheel, the lever then being positioned on the wheel and adjacent the link. The link may also include a plurality of apertures through which a pin may be inserted, the pin then being passed through a corresponding aperture provided on the handle of the lever assembly, to thereby secure the lever assembly to the link in a removable manner.

The apparatus may further include a braking assembly mounted on the frame that is selectively engagable with the peripheral surface wheel. Suitably the braking assembly includes a brace and a plate. The plate may include a tail for engagement with the brace and a tip for engagement with the peripheral surface wheel. Preferably the plate is positioned within the wheel mount. The brace may include a lever coupled to a pin. Suitably the pin is U-shaped with one arm of said U passing through the wheel mount.

BRIEF DETAILS OF THE DRAWINGS

In order that this invention may be more readily understood and put into practical effect, reference will now be made to the accompanying drawings, which illustrate preferred embodiments of the invention, and wherein.

DESCRIPTION OF THE PREFERRED EMBODIMENTS

Figure 1:
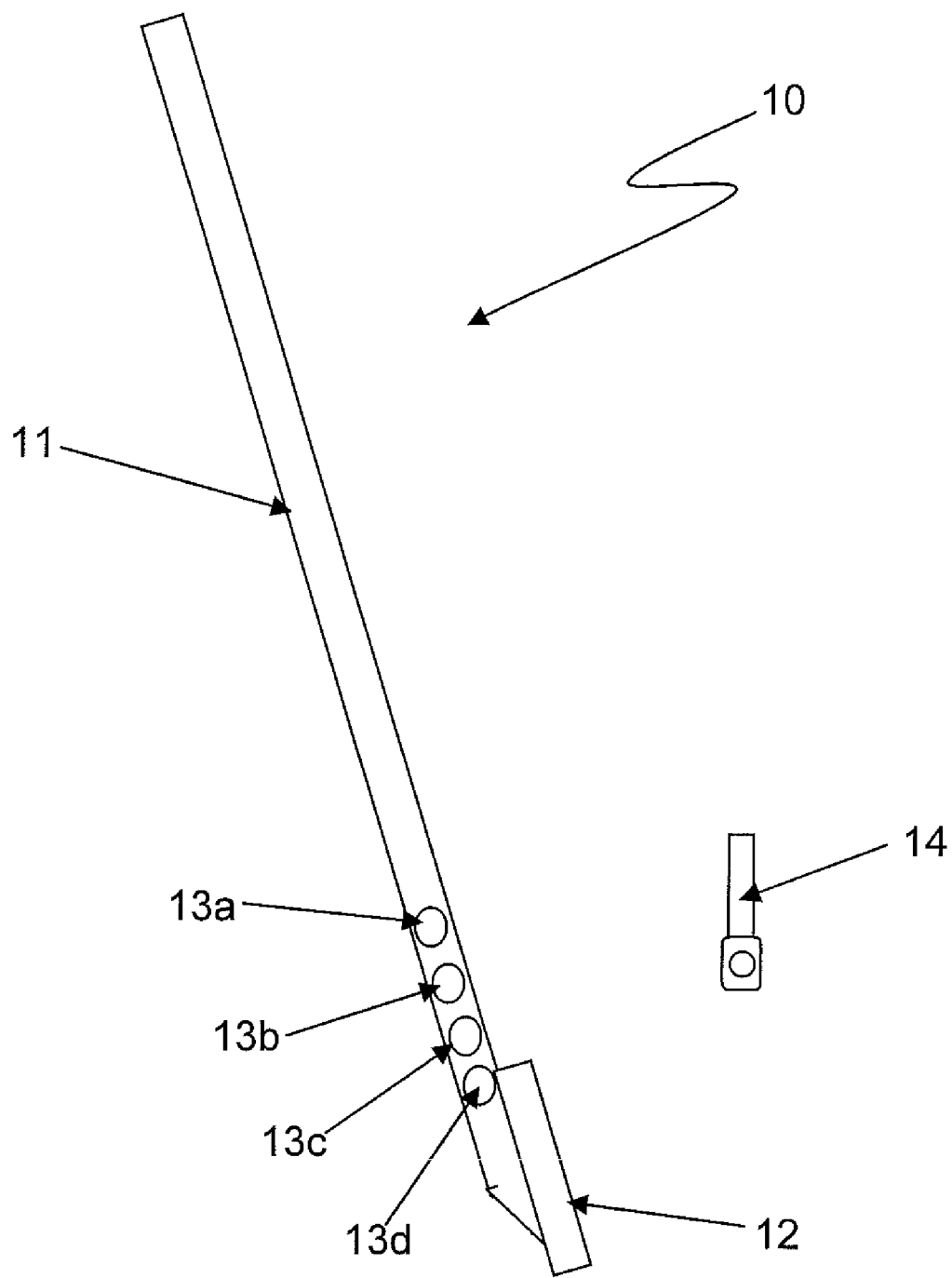
FIG. 1 is a schematic diagram showing one possible arrangement of a lever and a pin of a trailer alignment apparatus according to an embodiment of the present invention.

With reference to FIG. 1 there is illustrated an embodiment of the lever 10 for an alignment apparatus of the present invention. The lever includes handle 11 and pad 12 and a plurality of apertures 13a-d disposed along the handle at varying locations. Apertures 13a-d are provided so as to allow a pin 14 to be inserted therethrough. Pin 14 is adapted to pass through an aperture 21 in link 20 (see FIGS. 2 and 7A) thereby securing the lever 10 in a removable manner to link 20. The amount of purchase on the tyre 39 of the wheel 33 imparted by lever 10 is proportional to the distance of the pad to the aperture 13a-d at which the pin 14 is inserted. For example the maximum available purchase is provided when the pin 14 is inserted into the furthermost aperture 13a.

Pad 12 may be any suitable shape such as a square, rectangular, hexagonal, pentagonal or circular. However the pad 12 is most preferably substantially circular in shape. Providing a circularly shaped pad allows the lever 10 to be utilised through a wider range of angles θ to the vertical (see FIG. 6). This is particularly the case as discussed below in relation to FIG. 6 when the link is in the form of a tensile cable 23. In addition the pad may be provided with a frictional coating on its engagement face in order to increase the amount friction between the pad 12 and wheel 33 when engaged, thereby further increasing the amount of purchase on the wheel 33 during the lever's movement stroke. Alternatively the face of the pad 12 may be provided with a series of grooves that match or at least co-operate with the peripheral surface of the wheel 33. Upon engagement the pad with the wheel 33 the pad 12 is inserted within the corresponding groove thereby further increasing the amount of purchase on the wheel 33 during the movement stroke.

Figure 2:
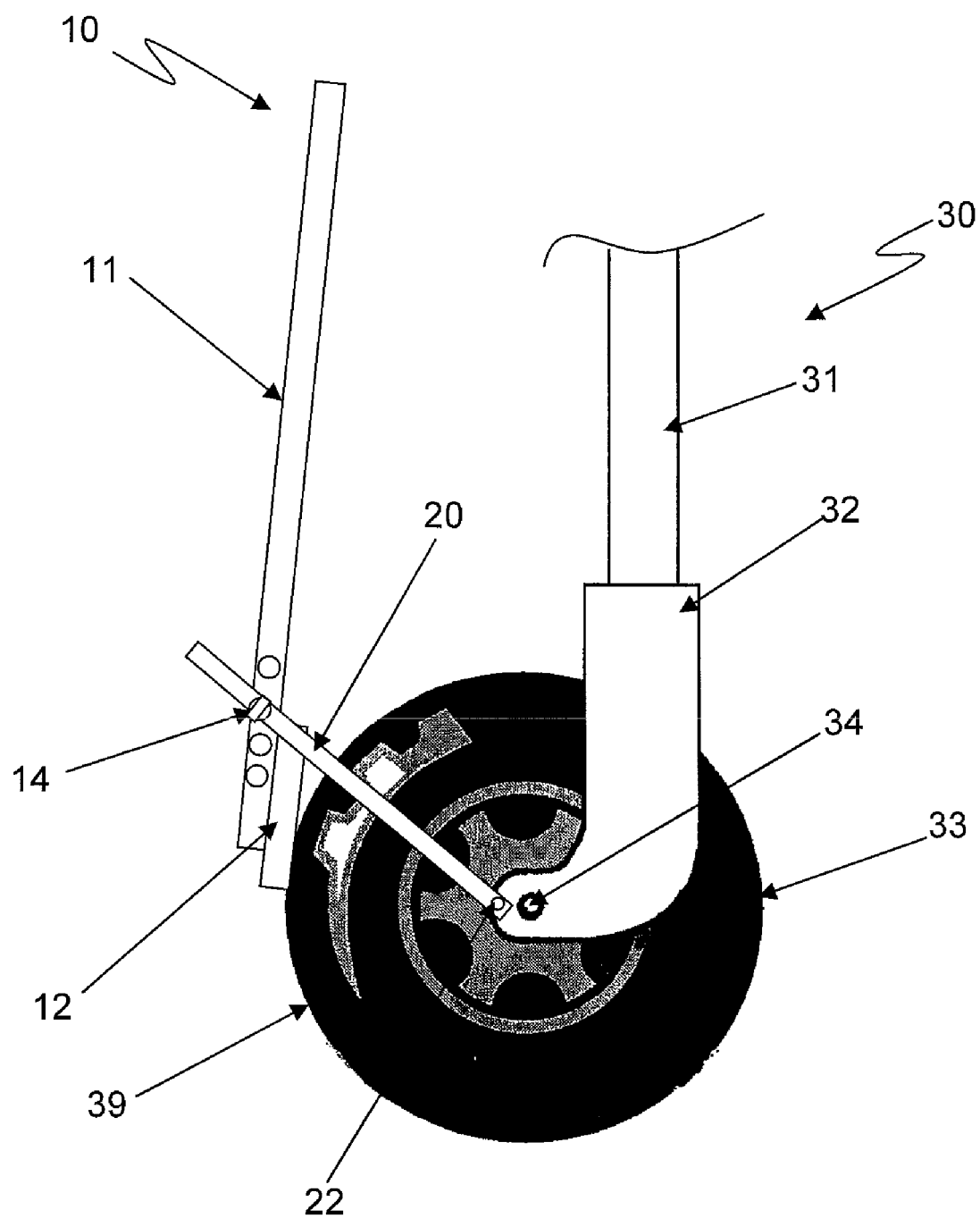
FIG. 2 is a schematic diagram depicting the trailer alignment apparatus according to one embodiment of the present invention in position on a jockey wheel assembly.

FIG. 2 depicts the trailer alignment apparatus of one embodiment of the present invention positioned on a jockey wheel assembly 30 which is attached to the trailer's A frame (not shown). The wheel assembly 30 includes wheel 33 having a treaded tyre 39 supported on axle 34 within a wheel mount 32 and an extendable support 31. Link 20 is pivotally mounted at point 22 on wheel mount 32 adjacent the axle 34. In use lever 10 is positioned adjacent the link 20 with pad 12 engaging the periphery of wheel 33, namely the treaded surface of tyre 39. Pin 14 is then inserted through aperture 21 in link 20 into one of the corresponding apertures 13a-d in handle 11 (in this instance aperture 13b).

Figure 3:
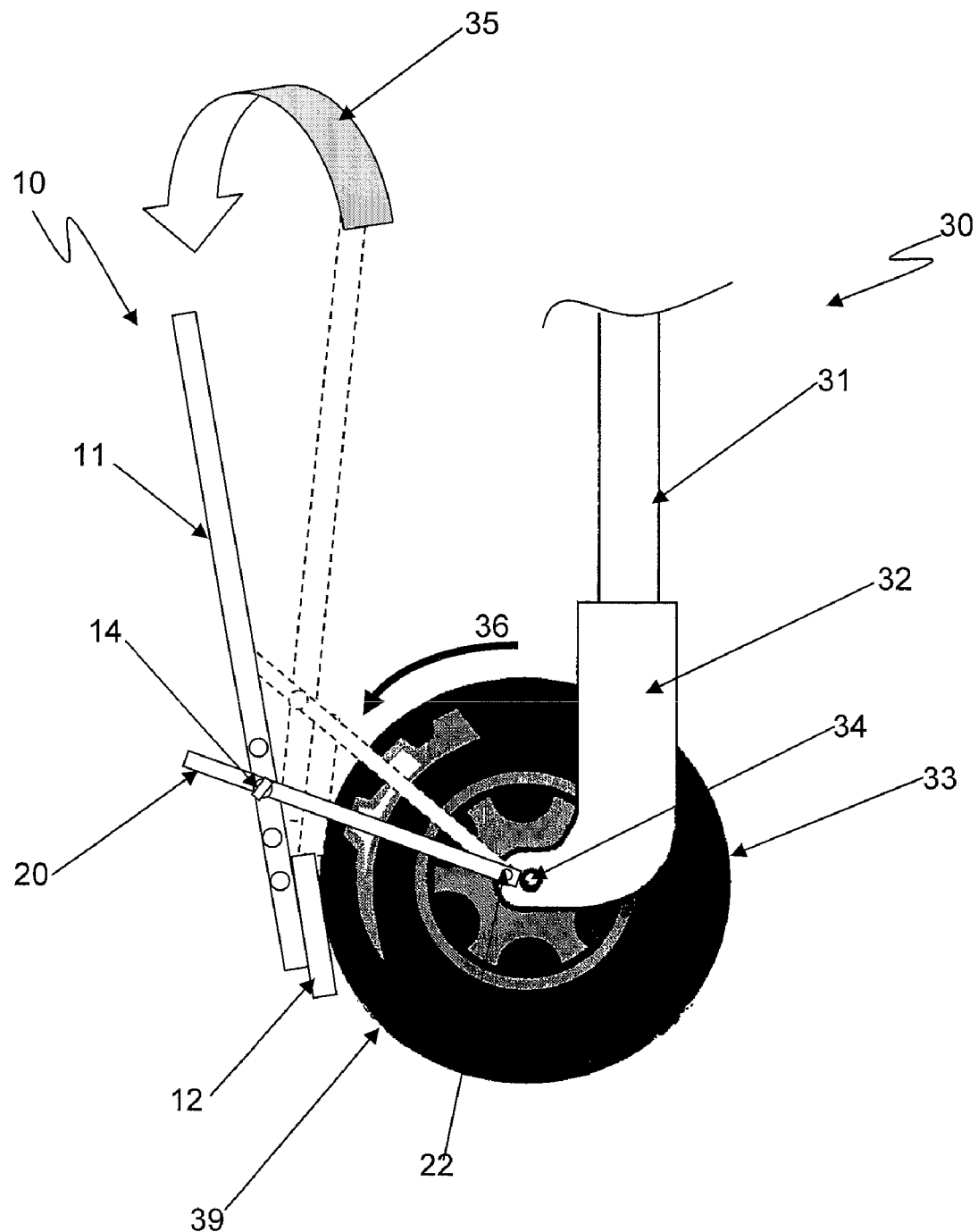
FIG. 3 is a schematic diagram depicting the trailer alignment apparatus of FIG. 2 during the driving stroke.

In order to align the towing hitch of the trailer with the tow ball the wheel 33 is inched forward by drawing down handle 11 as shown in FIG. 3. As handle 11 is drawn down by a user through a driving stroke in the direction of arrow 35, pad 12 grips the tyre 39 of wheel 33 thereby forcing it against the hub. Link 20 in turn pivots with the movement of lever 10 thereby causing pad 12 to rotate wheel 33 in the desired direction 36 to draw the trailer linearly in this case the forward direction.

Figure 4:
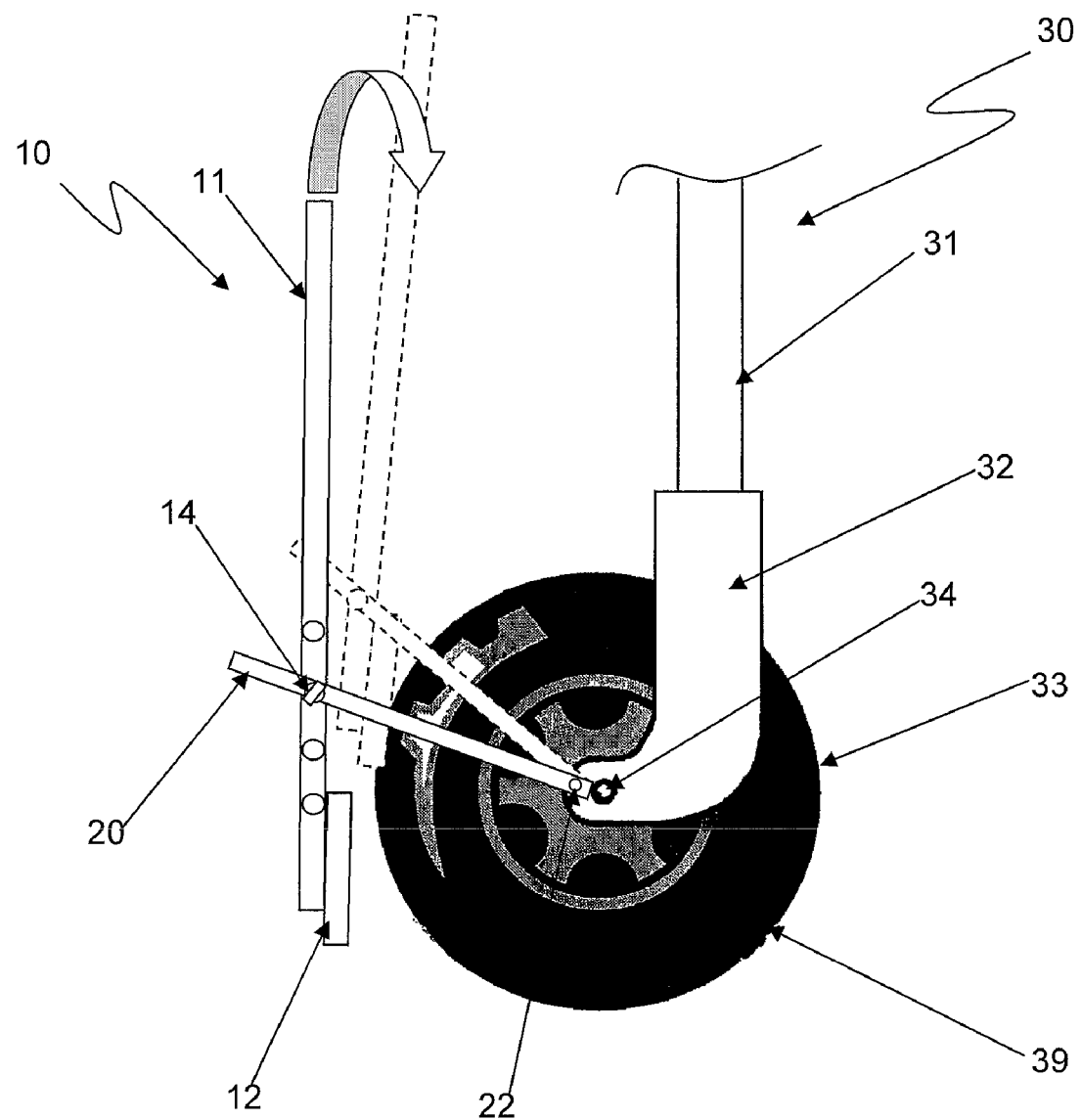
FIG. 4 is a schematic diagram depicting the trailer alignment apparatus of FIGS. 2 and 3 during the return stroke upon completion of the driving stroke.

Upon the lever 10 reaching the apex of the driving stroke (i.e. pad 12 is brought into contact with the ground), the pressure is released form handle 11 and pad 12 is removed from the tyre see FIG. 4. The lever 10 and link 20 are then returned to their positions prior to the commencement of the downward stroke 35 as illustrated in the dashed outline. The lever 10 may then be engaged with the wheel 33 ready for the next downward driving stroke 35. This process is then repeated until the towing hitch is positioned above or at least adjacent to the tow ball.

With the arrangement of the alignment apparatus as discussed with reference to FIG. 1 to 4, lever 10 may also be used to brake the wheel 33. By applying a sufficient downward force on handle 11, pad 12 is wedged against the tyre 39 forcing it against the hub preventing movement of wheel 33. Applying this type of braking to the wheel 33 steadies the trailer and reduces unwanted movement until the wheels of the trailer can be chocked. Once the chocks are in position the force may be released from handle 11 thereby disengaging pad 12 from wheel 33. The lever 10 and link 20 may then be returned to their initial position ready for the next downward stroke 35 as discussed above.

Figure 5A:
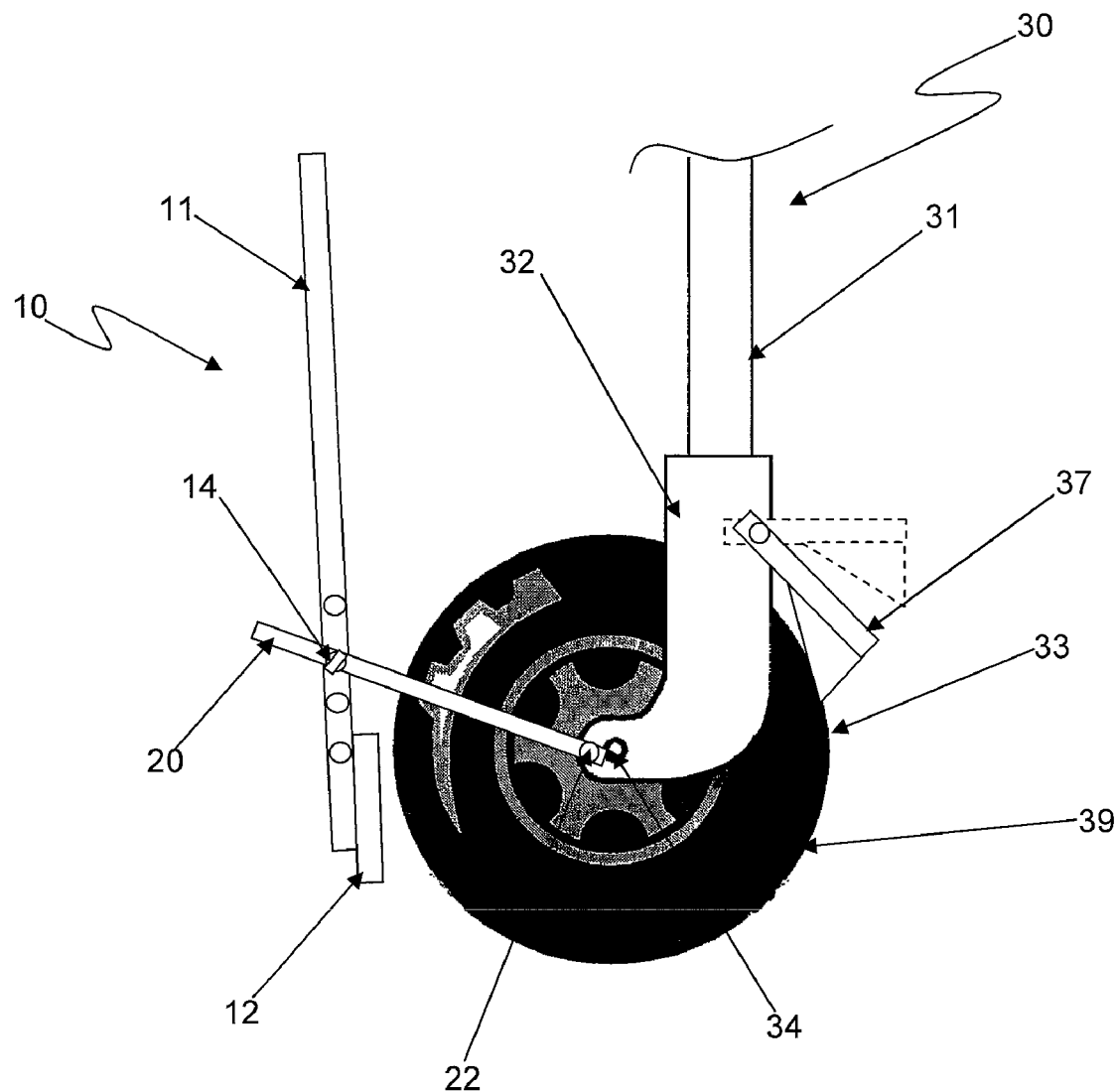
FIG. 5A is a schematic diagram depicting the alignment aid mounted on a jockey wheel assembly according to a further embodiment of the present invention.

In a further embodiment the jockey wheel assembly may alternatively be fitted with braking mechanism 37 as shown in FIG. 5A. The braking mechanism is engaged with the wheel 33 prior to removal of pad 12. Upon re-engagement of the pad 12 with wheel 33 at the top of the movement stroke (shown in dashed outline) brake 37 is released, and handle 11 drawn downward to impart movement of wheel 33 in the desired direction 36.

FIGS. 5B to 5F illustrate another possible arrangement of the braking mechanism for use with the alignment aid of the present invention. In this instance the braking mechanism includes a brace 40 and plate 38 which in the present case is positioned within the wheel mount 32. Brace 40 is includes a lever 41 which is coupled U-shaped pin 42. The plate 38 as shown includes a tail 45 for engagement with the brace, a tip 44 for engagement with the surface of the tyre 29. The tip being connected to the main body of the plate 38 via neck 43.

Figure 5B:
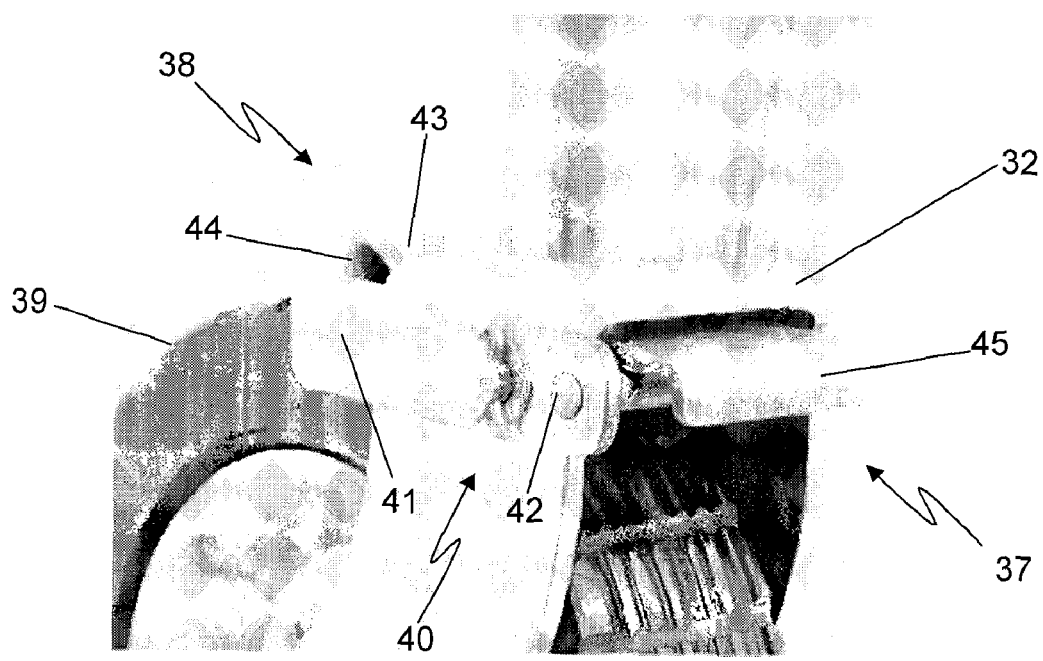
FIGS. 5B to 5G depict the stages in operation of another arrangement of a braking mechanism for use with the trailer alignment apparatus of the present invention.
Figure 5C:
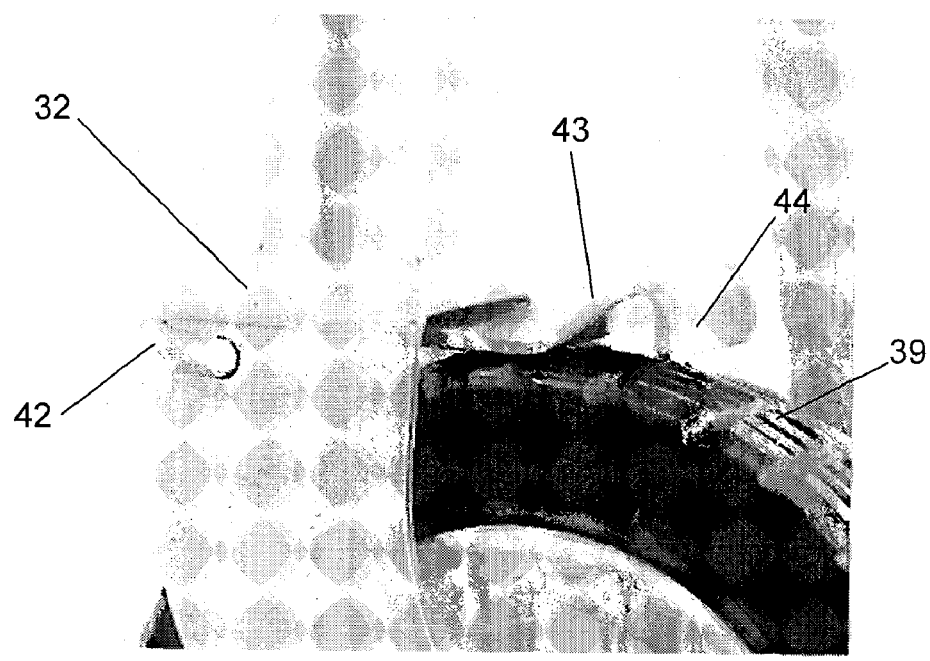

In FIGS. 5B and 5C the braking mechanism is shown in the locked position with tail 45 positioned over both arms of the u-shaped pin 42. In this position the main body of the plate 38 is free to rest upon the tyre 29 with the tip being elevated above the tyre 29 see FIG. 5C. In the locked position the breaking mechanism allows the wheel to move in the forward direction only. Any movement of the wheel in the opposing direction forces the plate 38 back toward the wheel mount 32 forcing tail 45 away from the external arm 42a of pin 42 see FIG. 5B. This causes the neck 43 to engage the wheel mount 32 forcing tip 44 to bite down onto the surface of the tyre 29 thereby braking the wheel 33.

Figure 5D:
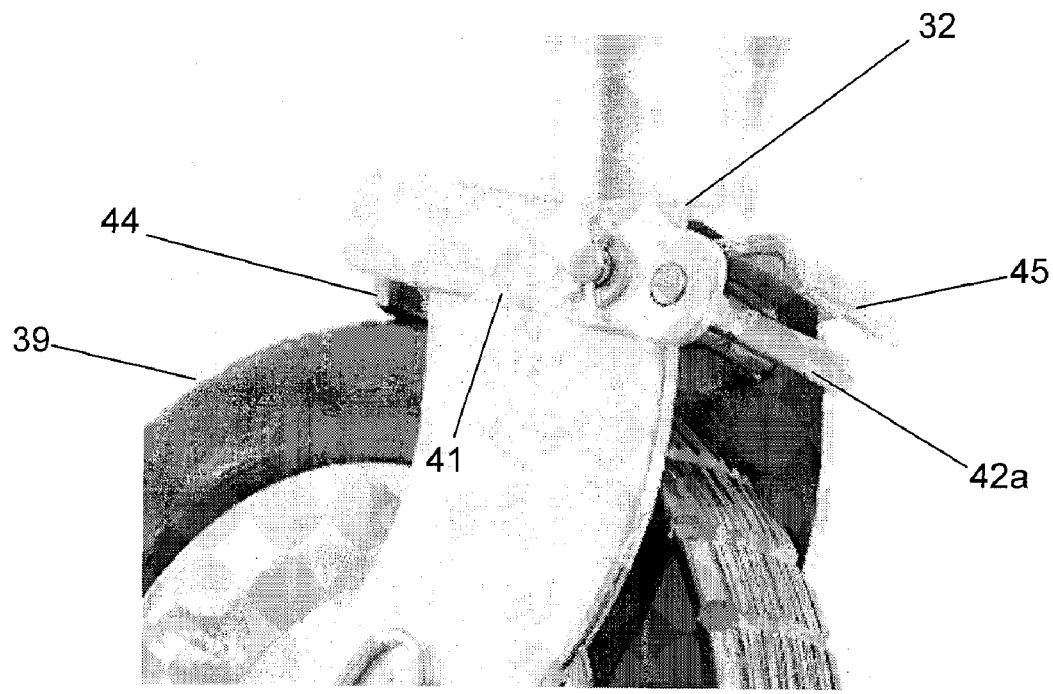
Figure 5E:
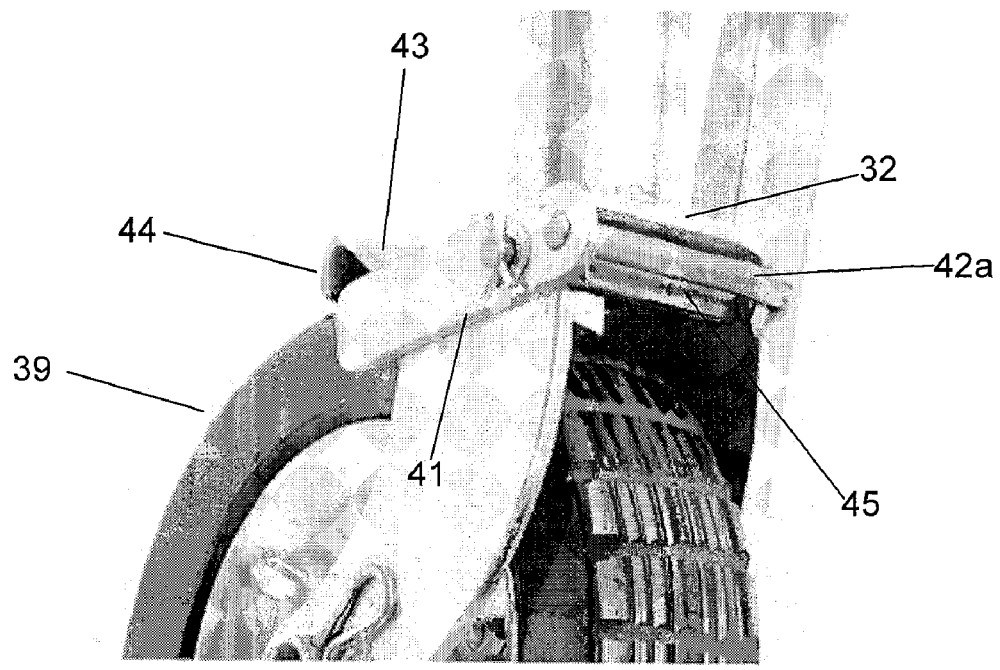
Figure 5F:
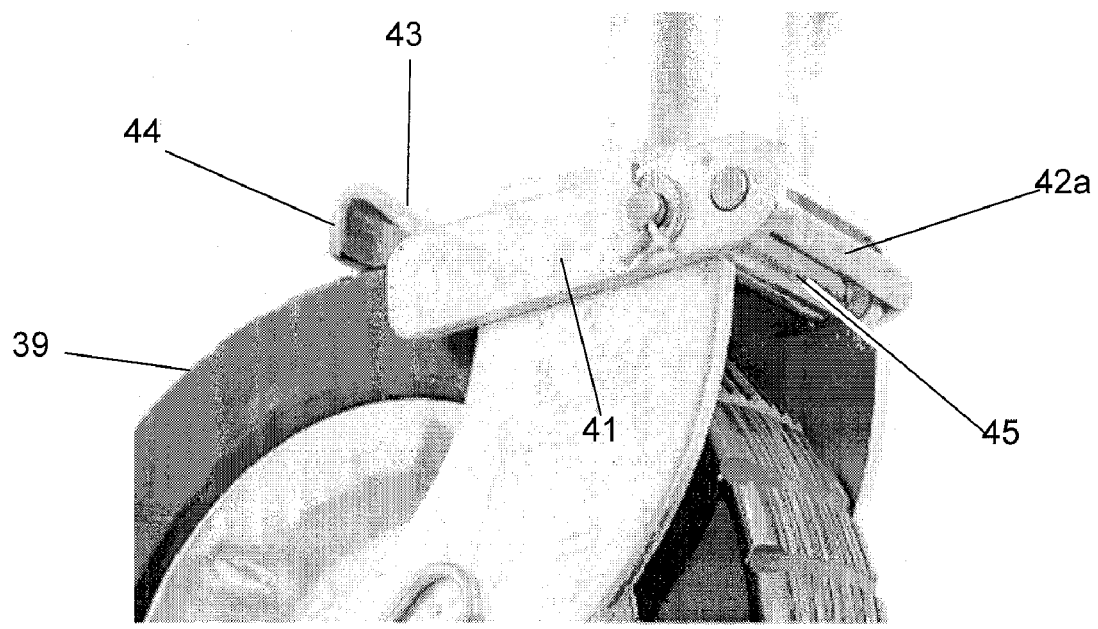
Figure 5G:
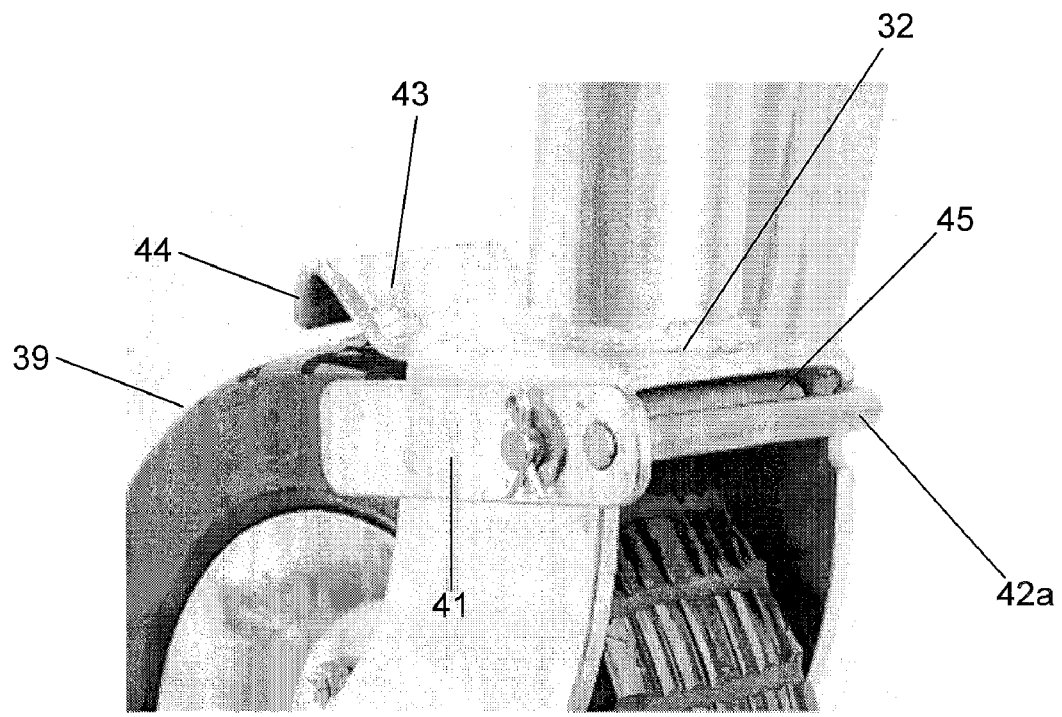

FIGS. 5D to 5F illustrate the various stages of releasing the brake mechanism to enable free motion of the wheel 33. In the initial stage of release the lever 41 of brace 40 is drawn upward forcing the external arm 42a of pin 42 downward and away from plate 38 (FIG. 5E). Plate 38 may then be manually drawn forward so that the tail 45 engages the internal arm 42b (not pictured) of the pin 42. Lever 41 is then pushed downward to its lowest most extent positioning the external arm 42a against the wheel mount 32 and drawing the internal arm 42b of pin 42 into engagement with tail 45 thereby wedging the plate against the stirrup of the wheel mount 32. This wedging action inturn raise the remainder of the plate including the neck 43 and tip 44 clear of the surface of the tyre 29 allowing wheel 33 to run free (see FIGS. 5G and 5F).

Figure 6:
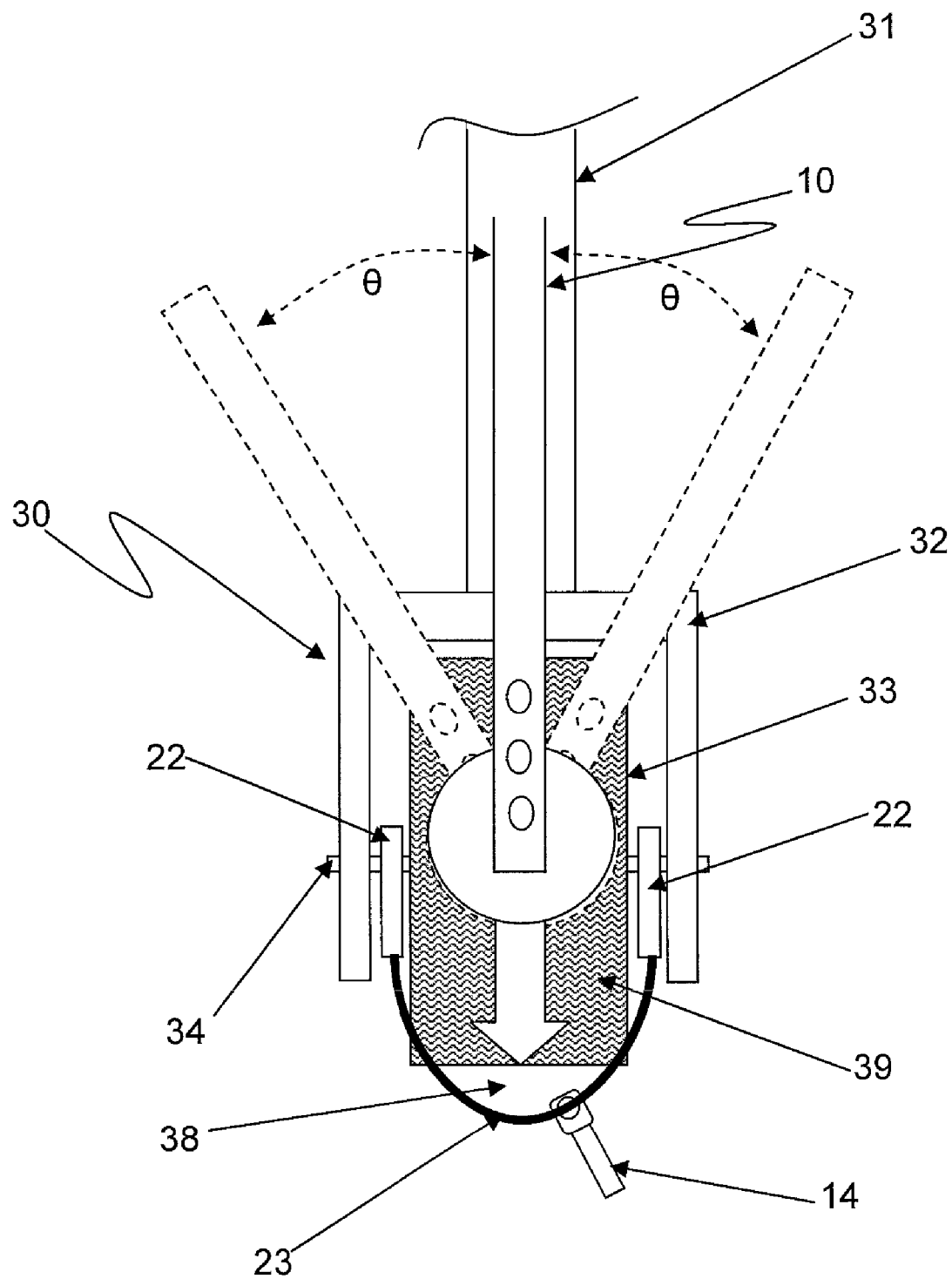
FIG. 6 is a schematic diagram depicting a still further embodiment the trailer alignment apparatus mounted on a jockey wheel assembly according to the present invention.

With reference to FIG. 6 there is shown an alternative embodiment of link 20 and the manner in which it is pivotally mounted on the jockey wheel assembly 30. In this instance link 20 is in the form of a tensile cable 23 coupled to mounting plates 22. The plates 22 are mounted on the axle 34 between the wheel mount 32 and wheel 33 such that cable 23 extends between opposite ends of the axle 34 and is positioned about the wheel 33 creating a space 38 therebetween. Pin 14 is slidably mounted on the cable 23. In operation lever 10 is positioned in the space 38 between the cable 23 and the wheel 33. Pin 14 is then inserted into the desired aperture 13a-d thereby removably securing lever 10 to link 20. Lever 10 may then be engaged with the wheel 33 in the manner discussed above in order to move wheel 33 in the desired direction. With this arrangement the position of the lever can be varied from vertical through a range of angles θ as illustrated by the lever positions shown in broken lines. Accordingly the user need not be directly in front of the jockey wheel assembly in order to use the lever 10 but can be to one side of the jockey wheel without a losing purchase on wheel 33.

Figure 7A:
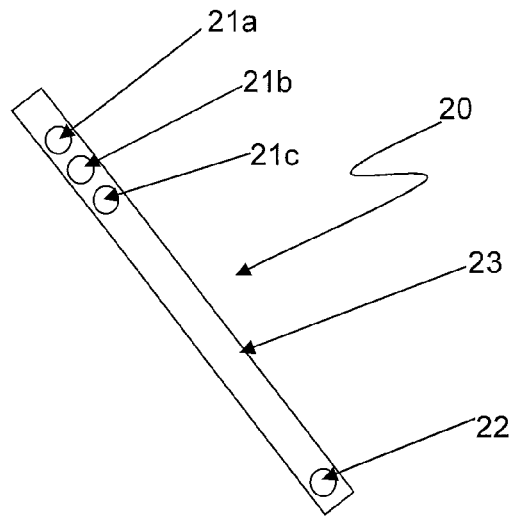
FIG. 7A is a perspective view of a link member according to one embodiment of the present invention.
Figure 7B:
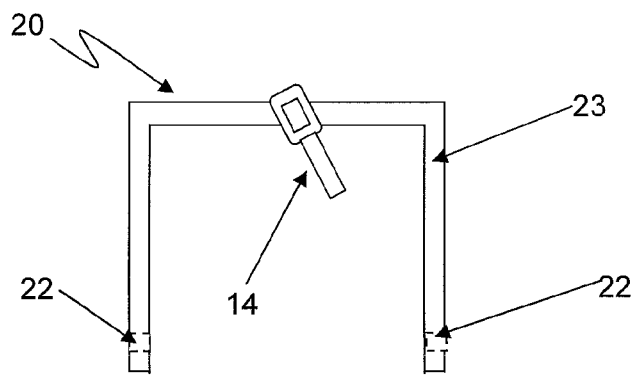
FIG. 7B is a schematic view of a link member according to a further embodiment of the present invention.
Figure 7C:
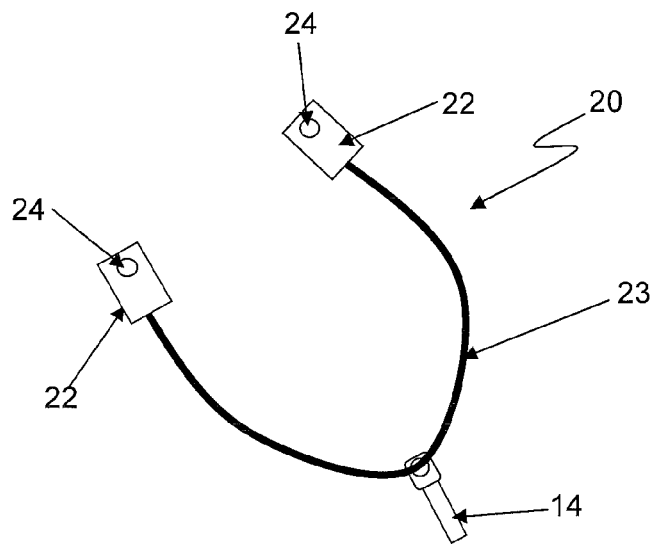
FIG. 7C is a perspective view of a link member according to a still further embodiment of the present invention.

FIGS. 7A to 7C illustrate in greater detail a number of possible configurations of the link 20. FIG. 7A depicts a rigid link 20 in the form of a single bar 23 not unlike that discussed above in relation to FIGS. 2 to 5. Bar 23 includes a number of apertures 21a-c through which pin 14 can be inserted, this enables the position at which lever 10 is secured to the bar 23 to be selectively varied. Bar 23 also includes a mounting aperture 22 via which the link 20 is pivotally mounted to the wheel mount 32 or on axle 34 and is held in position by a suitable fastening means such as a bolt, cotter pin or CER-clip.

FIG. 7B shows the link 20 in this instance in the form of rigid U or C shaped bracket 23, upon which pin 14 is slidably mounted. The bracket 23 includes mounting apertures 22 via which the link 20 is pivotally mounted to the wheel mount 32 or on the axle 34 by a suitable fastening means.

FIG. 7C depicts a flexible link 20 in the form of a tensile cable 23. Cable 23 is attached to a pair of mounting plates 22 having apertures 24 via which the link 20 is pivotally mounted on the axle 34 of wheel 33. The cable 23 may be attached to the mounting plates 22 via any suitable means e.g. the ends may be swagged to the plates. An alternative arrangement for mounting the cable 23 to the axle 34 is the simply for a loop at end these loops are then secured back to the main cable 23 by a swagged connector.

Figure 8A:
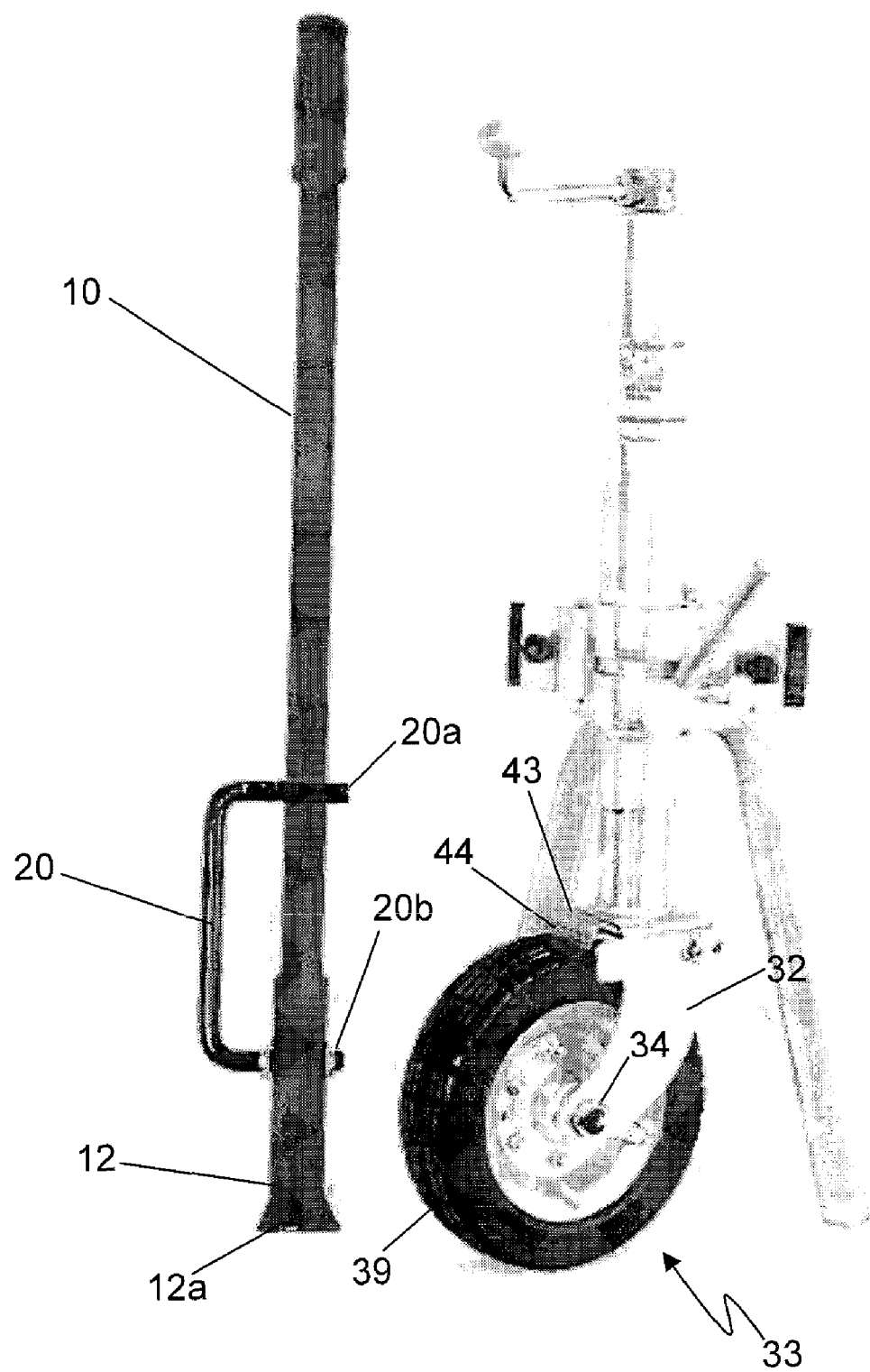
FIGS. 8A to 8C illustrate stages in operation of a further embodiment of the trailer alignment apparatus of the present invention.
Figure 8B:
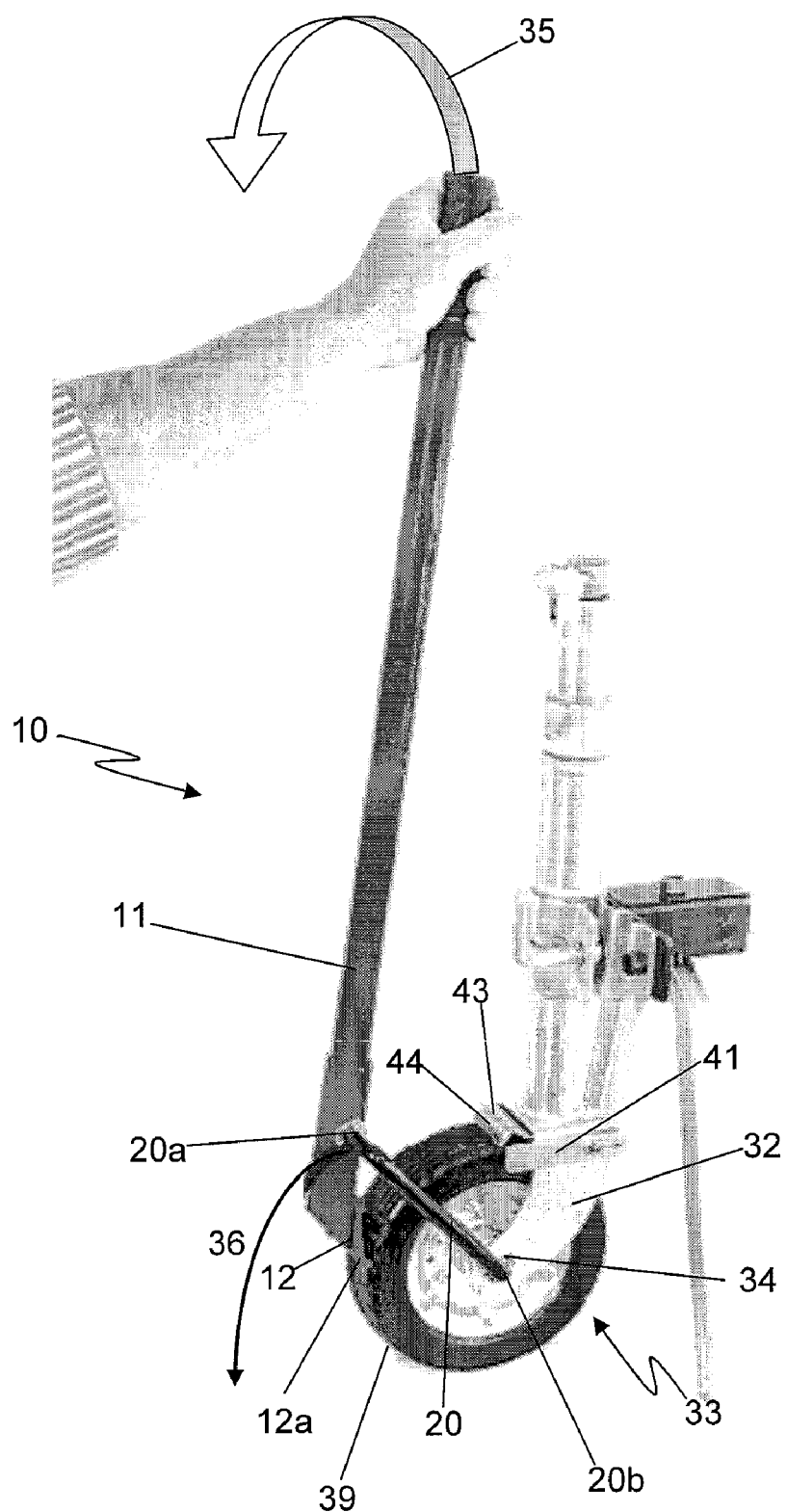
Figure 8C:
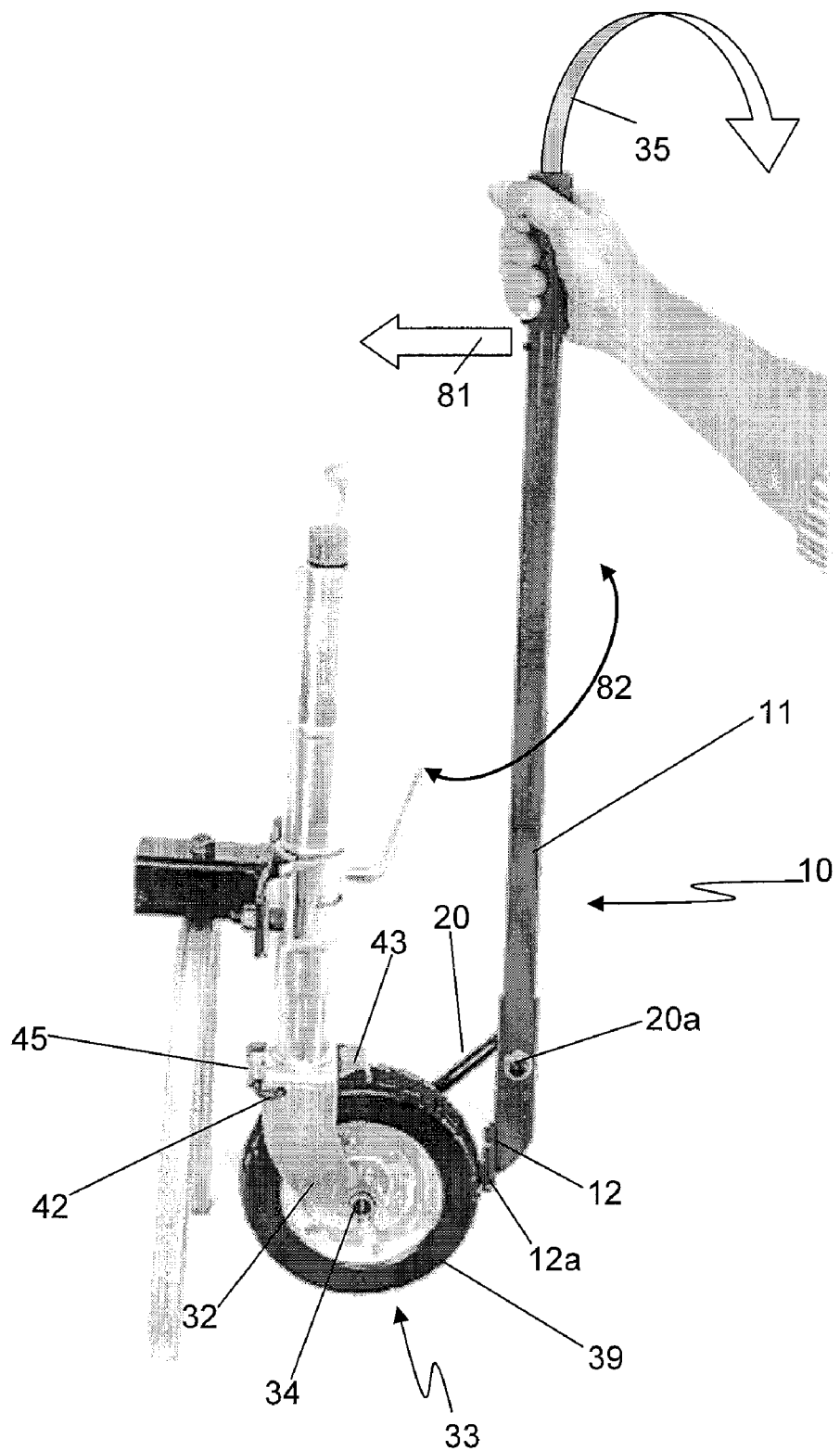

FIGS. 8A to 8C illustrate a further embodiment of the alignment apparatus of the present invention. In this instance the link 20 is in the form of a rigid C shaped bar with end 20a coupled to the lever 10 at a predetermined distance from the wheel engagement portion 12. End 20b of the link 20 is adapted to be pivotally mounted within hollow axle 34. Lever 10 is secured to link in such a manner so as to enable the lever 10 to be pivoted about end 20a. The wheel engagement portion 12 in this particular case includes at least one tooth 12a, said tooth being shaped for complementary engagement with the peripheral surface 39 of the wheel 33. As shown in FIG. 8a link 20 and lever 10 are designed to be removable from the jockey wheel assembly. As lever 10 can be pivoted about end 20*a* the link 20 may be conveniently fold against the lever 10 for easy of storage.

FIG. 8B shows the link 20 and lever 10 mounted in situ on the jockey wheel assembly with end 20*b* being mounted within hollow axle 34. Applying a driving force 35 in the direction of arrow 35 cases the tooth 12*a* of wheel engagement portion 12 to grip the tyre 39 rotating the wheel in the direction of arrow 36.

FIG. 8C shows the reverse angle of the apparatus as shown in FIG. 8B by applying a lateral force in either of the directions indicated by arrow 82 directs the wheel in a desired direction of travel. Once the wheel is positioned in the desired direction of travel a driving force is applied in the direction of arrow 35 cases the tooth 12*a* of wheel engagement portion 12 to grip the tyre 39 to rotate the wheel to thereby move the trailer in the desired direction of travel. At the base of the drive stroke a force is applied in the direction of arrow 81 causing lever 10 to pivot about end 20*a* of link 20 thereby releasing tooth 12*a* from tyre 39. Upon release a user may then change the direction of the tyre if required or simply return the lever to the top of the drive stroke if further movement in the desired direction is required.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

I claim:

1. An alignment apparatus for maneuvering a trailer having jockey wheel assembly comprising a ground engaging wheel, said apparatus comprising:
    a link member coupled to a lever assembly adapted to engage a peripheral surface of said wheel, wherein said wheel being rotatably mounted on a hollow axle;
    said link member adapted for insertion into said hollow axle to thereby pivotally mount the link member and lever assembly on the jockey wheel assembly; and
    whereby, upon insertion of the link member into said hollow axle, lateral movement of the lever assembly directs the wheel on a desired direction of travel and, upon the lever assembly engaging said wheel, rotation of the lever assembly about the pivotal mount acts to rotate the wheel for maneuvering the trailer in the desired direction of travel.

2. The apparatus of claim 1, wherein said lever assembly further comprises a handle and a wheel engagement portion disposed at an opposite end of the lever to said handle; and said link member being pivotably coupled to said lever assembly.

3. The apparatus of claim 2, wherein the wheel engagement portion is coated with a material having a relatively high co-efficient of friction.

4. The apparatus of claim 2, wherein said wheel engagement portion comprises at least one tooth, said at least one tooth being shaped for complementary engagement with the peripheral surface of the wheel.

5. The apparatus of claim 1, further comprising a braking assembly mounted on the jockey wheel assembly, which braking assembly is selectively engagable with the peripheral surface of said ground engaging wheel.

6. The apparatus of claim 2, further comprising a braking assembly mounted on the jockey wheel assembly, which braking assembly is selectively engagable with the peripheral surface of said ground engaging wheel.

7. The apparatus of claim 3, further comprising a braking assembly mounted on the jockey wheel assembly, which braking assembly is selectively engagable with the peripheral surface of said ground engaging wheel.

8. The apparatus of claim 5, wherein the at least one tooth is coated with a material having a relatively high co-efficient of friction.

\* \* \* \* \*